(12) United States Patent
Prinstil (10) Patent No.: US 8,978,464 B2
(45) Date of Patent: Mar. 17, 2015

(54) MAGNETOSTRICTIVE PROBE WITH INVERTED SIGNAL DETECTION

(71) Applicant: Ambroise Prinstil, East Hartford, CT (US)

(72) Inventor: Ambroise Prinstil, East Hartford, CT (US)

( * ) Notice: Subject to any disclaimer, the term of this patent is extended or adjusted under 35 U.S.C. 154(b) by 273 days.

(21) Appl. No.: 13/767,864

(22) Filed: Feb. 14, 2013

(65) Prior Publication Data

US 2014/0224010 A1  Aug. 14, 2014

(51) Int. Cl.
*G01B 7/02* (2006.01)
*G01F 23/30* (2006.01)
*G01F 23/72* (2006.01)
*G01F 23/296* (2006.01)

(52) U.S. Cl.
CPC ............... *G01F 23/30* (2013.01); *G01F 23/72* (2013.01); *G01F 23/2963* (2013.01)
USPC .......................................... 73/313; 324/209

(58) Field of Classification Search
CPC ..... G01F 23/72; G01F 23/2963; G01F 23/30; G01F 25/0069
See application file for complete search history.

(56) References Cited

U.S. PATENT DOCUMENTS

| 4,939,457 | A  | * | 7/1990  | Tellerman    | 324/207.13 |
| 5,076,100 | A  | * | 12/1991 | Hunter et al. | 73/290 V   |
| 5,421,193 | A  | * | 6/1995  | Carlin et al. | 73/49.2    |
| 6,561,022 | B1 | * | 5/2003  | Doyle et al. | 73/313     |
| 6,802,218 | B2 | * | 10/2004 | Patel        | 73/290 V   |
| 2009/0320569 | A1 | * | 12/2009 | Haslem et al. | 73/61.41 |

* cited by examiner

*Primary Examiner* — Michael Zarroli (57) ABSTRACT

An alternate construction and method for a magnetostrictive probe intended to be used as a tank monitoring device. Height determination, either water or fuel, is referenced to an ultrasonic pickup assembly located inside the shaft at the foot of the probe. With this inverse approach, height measurement uses the relative geothermal stability of underground storage tanks, or the temperature stability offered by the thermal mass of the fuel, to facilitate a tank level determination. At that new location, the detection circuit is isolated from the effect of magnetic risers, large temperature swings and other undesirable phenomenon that often affect magnetostrictive probe measurements that are referenced to the canister. Aside from its primary use as referred to by this disclosure, this probe could be adapted for any application necessitating precise knowledge of height or distance measurement in relation to the foot of the probe without using a reference magnet.

19 Claims, 12 Drawing Sheets

MAGNETOSTRICTIVE PROBE WITH INVERTED SIGNAL DETECTION

PRIORITY CLAIM

The application described within claims the benefit of U.S. Provisional Patent Application Ser. No. 61/602,119, filed Feb. 23, 2012, which application is hereby incorporated by reference.

FIELD OF THE INVENTION

This present invention pertains to a linear positioning sensor intended for height and distance measurement. As used in this application, it is adapted for liquid level measurement particularly fuel and water level as found in fuel storage tanks. Other applications such as density and other fuel quality parameters may be ascertained from the information obtained from this device. Data coming from this sensor is relayed to a monitoring console where algorithms are used to further evaluate the different parameters inside of a tank.

REFERENCES CITED

| | | |
|---|---|---|
| 2,995,736 | August 1961 | Tellerman |
| 5,017,867 | May 1991 | Dumais et al. |
| 5,076,100 | December 1991 | Hunter et al. |
| 5,258,707 | November 1993 | Begin et al. |
| 5,998,991 | December 1999 | John D. Begin. |

BACKGROUND OF INVENTION

Many types of sensors are used for tank level detection. For tank level monitoring, magnetostrictive probes are overwhelmingly used to detect various parameters inside of a tank. Notwithstanding this complex task, is the application of precisely determining the fuel and water levels based on the signals resulting from the magnetic interaction between circumferential fields from an applied current in a ferromagnetic wire to those of permanent magnetic fields from a permanent magnet located within a floatation device. Tanks used in fueling environments are usually located underground. Liquid fuels such as gasoline or diesel are stored in bulk until they are dispensed to customers by means of the station's dispensing equipment. Environmental compliances require that monitoring systems be in place to determine inventory and leakage.

Similar to its use in this invention, a magnetostrictive probe is fitted into a tank, and is comprised of a shaft that protrudes over the height of the entire tank. Detections and logic circuitries are located inside of a canister, usually situated on top of the shaft. The probe and other accessories, like floats, are introduced into the tank via a riser pipe connected to the tank. The probe is then connected to a monitoring system, to which data from the probe is sent, in order to determine the status of the tank. The means of ascertaining the levels, "fuel" and "water", are commonly accomplished through the utilization of floating bodies, each carrying a magnet. The floats are often constructed of materials such as Nitrophyl, Buna-N, Urethane and Stainless Steel. In the tank, floats are calibrated to have densities that are less than the fuel they are intended to monitor in order to float at the surface of said liquid; in this case gasoline products. Floats are allowed to sink into a fuel layer to stop at the interface of another fluid where the buoyancy forces exerted by the combined liquids, one liquid affecting the upper portion of the float and the other liquid affecting the lower portion, matches the weight of the float in question. In this instance, the float remains at the interface of the two liquids. By this method, systems are not limited to only two floats. A multiplicity of such floats could be adapted into a single probe intended to be used in a tank having various fluids of different densities.

The magnetostrictive probe detection apparatus is set to locate the presence of a magnet along the shaft by means of an interaction between permanent magnetic fields emanating from a magnet and circumferential fields induced by an electric current pulse into the sonic waveguide which is a nickel-alloy based wire. With the float slidably situated along the probe's shaft and carrying a magnet, the system is able to determine the exact position of the float along the shaft. This is accomplished by means of the known propagation velocity of the twist in said wire resulting from the interaction between the two magnetic fields previously mentioned. The delta time from when the current pulse was applied to the ferromagnetic wire to the time a resulting twist is detected by the wire twist sensing pickup apparatus represents the time interval taken for the wave to propagate along the wire medium from its origin. When that delta time is divided by the known propagation velocity of the twist in that particular wire, or its gradient, the magnet's exact location in relation to the detector is then calculated by the system.

$$D = \frac{\Delta T}{G}$$

Where:
D=Distance being measured
$\Delta T$=Time from when the current pulse was launched in the wire to when the twist is received by the pickup in Seconds
G=Gradient or the wave velocity of propagation in Sec/inch The detection apparatus could be a pickup coil, a piezoelectric crystal or received by means of mode converter tapes coupled to the waveguide. In the case of the pickup coil, a twist emanating from the two magnetic fields travels the wire as torsional waves and arrives at the coil base and causes disturbances in the previously aligned domains in the said waveguide, which in turn induces a voltage into the coil. In the case of the piezoelectric detector, the arriving mechanical wave causes an oscillation of the crystal. That oscillation produces a similar effect of inducing a voltage in the crystal. The mode converters translate the torsional waves into longitudinal waves that get measured by means of coils or crystals to produce a voltage. In all cases, the resulting signal is amplified and detection circuits are set to process the signal out of which further calculations are made.

In prior art, while the measurement obtained is relative to where the float is located to where the pickup coil is, namely inside the canister at the top of the tank, it does not tell exactly the level in relation to the bottom of the tank. To ascertain this, various techniques are used. In some cases, the distance measurement to a pickup located in the canister is made, and is subtracted from a predetermined tank diameter in order to relate the height from the tank's bottom. Other techniques make use of a reflected termination at the bottom of the wire to ascertain the end of the probe. While this technique offers the benefit of having the distance resolution doubled, the pulses still have to travel up to the canister to be measured as in the first case. Meanwhile, the reflected pulse introduces an error in the absolute measurement. If not accounted for it could result in a much larger error in the determination of the tank's bottom than in the first case. The more distance a signal has to travel, the more attenuation will result. Because of this, reflected termination is not practical to be used for very long probes. In other instances, the use of a reference magnet located at the foot of the probe is made. A gate is formed from the time the signal from the fuel float arrives at the sensing element to when the reference is detected. That time differential approach is a more direct measurement in relation to the bottom of the tank than the previously described methods, but not without some drawbacks.

This reference magnet may be situated internally or externally to the probe shaft. If the reference magnet is not located at the very tip of the wire, which is only possible if it is situated inside the pipe, or the probe is not resting at the bottom of the tank, there may result some drifting in position measurement due to the wire roving about that reference point. When this happens, the measurement is not stable since temperature changes seen by the whole probe will cause the system to shift in various parameters, including probe length, and introduce errors in the measurement. If the reference magnet is located externally to the probe, the obtained height will be affected by temperature drifts.

SUMMARY OF INVENTION

It is the aim of this invention to offer a solution to the mentioned signal detection problems, while offering a more accurate measurement by eliminating other factors that often affect the accuracy of the height measurement as well. As such, an improved magnetostrictive probe will result that will provide an accurate bottom reference for fuel and water levels. This new approach will thus allow for as true and accurate a measurement capability to be performed by this technology for tank level monitoring or for bottom referenced measurements.

When a current pulse is applied to a ferromagnetic waveguide that has a permanent magnet in its near proximity, a twist is produced at the intersection of the magnetic fields. The resulting waves travel in both directions in that waveguide. It is conventional that the forward pulse traveling toward the canister is measured while the one travelling in the reverse direction toward the foot of the probe is attenuated to avoid multiple reflections in the wire. Thus, most probes have a dead zone where the damping material that performs this attenuation role is located. Other techniques reflect the opposing wave and measure the time it takes to be sent back to the pickup, as a means of doubling the resolution. This in turn produces multiple signals in the waveguide and as a result more baseline noise. In the inverse of this conventional location of the sensing element, in this new approach, the detection apparatus, whether a coil, a piezoelectric crystal, or mode converter tapes, is relocated to be inside the tube at the foot of the probe. Also, the tensioning and damping apparatus trade places and are repositioned inside the canister.

With this detection approach there is no need to either use a reference magnet, or perform a reflected pulse scheme to achieve a bottom measurement. The reading obtained while direct from the magnet's location is also made toward the direction of the tank's bottom. In this mode, while the fuel is rising or falling, the direct measurement will follow the same direction as that of the level in the tank.

There are many technical advantages associated with this strategic location of the sensing element at the foot of the probe. It eliminates the need to derive the tank's bottom level by assumption or some other schemes. The prior art approaches often introduce errors in level determination from a tank's bottom. This new technique also aims at removing the pickup element from the can where it is subjected to many undesirable influences such as temperature, vibrations, pickup movement due to expansion and contraction in the tube, the effect of magnetic risers, and electromagnetic influences. There are other benefits of this swap that have to do with shifting the waveguide away from the center of the tube where it will take advantage of stronger magnetic fields emanating from the permanent magnets located in the floats. With this kind of arrangement, the fields from a permanent magnet reaching the waveguide is stronger and therefore a stronger signal is obtained. This latter technique offers a twofold benefit: either using a lower current drive in the wire making the system safer in terms of intrinsic safety, or facilitates the construction of longer probes with reduced energy to drive the wire.

The object of this invention is to arrive at a more accurate and reliable magnetostrictive probe for measuring fuel or water level in a storage tank. Some of the advantages will be highlighted as the preferred embodiment is described. For an illustrative application of this invention, refer to the accompanying drawings and the detailed description that follows.

BRIEF DESCRIPTION OF THE DRAWINGS

FIG. 2 shows an abbreviated description of the construction of this probe. The main feature 'bottom pickup assembly 140' incorporating the bottom detection and the top wire tensioning assembly 110 are seen in this arrangement. The bottom compression assembly is also represented. The offset assembly allowing the ferromagnetic wire to closely run along the pipe 102 can be observed as well.

In FIG. 3 an expanded view of the foot of the probe showing the various components and their arrangement can be seen. There, the bottom compression assembly, made of spring 160, the two carriers 121 and 122, and the bottom pickup assembly 140 are illustrated. The amplifier circuit board 170 is shown coupled to the bottom pickup assembly 140 and is running up through the bottom compression assembly.

The top frame 105 and its internal assembly supporting the tensioning assembly 110 is represented in FIG. 6. The frame offers enough spacing for free operation of the tensioning assembly 110 while leaving sufficient room to accommodate placement of boards containing more circuitry on either side of the tensioner. The frame would be enclosed in a canister, not shown, where it would be sealed by a pair of O-rings 109 located on top near the connector, and a second one 108 at the base of the frame. Together they would seal the contents of the probe against moisture and gasoline fumes.

Tensioning assembly 110 is represented in FIG. 7 with an exploded view of the many parts contained within. It starts with frame 111 that is a plastic skeleton of the assembly. It has an internal cavity where the waveguide's electrical contact piece 112 is inserted. Following in the assembly is the secondary damper 113 that is made of a rough material capable of absorbing the undesired waves. Preceding this is damper 114 which is made of a softer material designed to allow a smooth transition of the wave to the coarser damper without reflecting it to the wire. This is particularly of high value in cold regions when the cold temperature will harden the material to the degree when it becomes more reflective than absorbing. Next in line comes the data validation magnet 115 which benefits will be explained later. Finally surrounding the whole assembly is the spring 116 which is intended to maintain the wire under tension. The whole assembly is kept together by lips 111B of frame 111.

To keep the whole assembly together.

FIG. 8 also represents internal tube 104 that is the channel in which the Nichrome wire is placed and also constitutes the isolation shield for the waveguide. To further help in isolating the waveguide from touching the walls of the inner tube 104, the isolators 190 are inserted through holes 107 intended for this purpose. Isolators 190 are made of soft rubber and are split down the middle to allow for easy insertion. By way of holes 107, isolators 190 are installed over the wire and surround it with minimal contact.

Running along the spacers 120 is harness 200 carrying the temperature sensors. In this strategic location, the sensors will be contacting or be in near proximity with the outside tube 102. From that location, they will be able to sense the temperature of the fuel that is in contact with outside tube 102 rather than the ambient air where they are located.

FIGS. 9A and 9B are illustrations of the construction of bottom pickup assembly 140. Figure A shows the parametric view of the part with its sturdy bottom piece where cavities 143 and 144 are shown. On the back wall of this part is support 141, while the front shows slot 147. Each of the features enumerated serve at facilitating the assembly of board 170 and pickup 150 respectively. Figure B shows the wire channels 145 used to loop the waveguide around to arrive at the contact terminal 171. At that point of contact, the pulsed current is supplied to the wire. From that view, hole 142 can be observed where terminal 171 would be fed through. This arrangement would secure the board in place preventing it from moving and causing dislodgement of the amplifier board.

FIG. 10 is a representation of the pickup coil 150. This is an exploded view allowing one to observe the many facets of this relatively small part. Coil cavity 151 is seen where the winding would be located. Lips 152 and 153 serve at preventing the bobbin from moving up and down in bottom pickup assembly 140. The sides 155 in comparison are of a square shape to prevent the bobbin from rotating once installed in cavity 144. Refer again to FIG. 9 to note the sides that will accommodate this particular shape. Then bottom cavity 154 is where a small tubular damper 156 will be installed to allow further signal damping from being reflected back into the waveguide and the pickup.

FIG. 11 is a reduced view of the amplifier board 170. This board will serve many purposes. It will carry the electronics needed to amplify the signal from the pickup coil; it will be the bridge separating the bottom compression assembly and the bottom pickup assembly 140, while at the same time being the means by which the downward force is exerted to keep the bottom pickup assembly in its fixed position at all times. The ledges 172 are the resting place for spacer 122 while the later will be used as a spring carrier. See FIG. 3 for the illustration of this arrangement. Section 175 of the board does not carry any circuitry, but serves as a connector for the lower part of the board. It is also used as a centering piece keeping spacers 121 and 122 lined up. This section of the board allows for free up and down motion of spacer 121 as the expansion and contraction of the probe requires.

FIGS. 12A and 12B are shown representing two opposing configurations. In figure A, a prior art assembly is located inside a riser that is magnetically charged. In figure B, that same riser contains the probe of this present invention.

DETAILED DESCRIPTION OF PREFERRED EMBODIMENTS

For over half a century since magnetostrictive technology has been in use for linear positioning devices, there has been many configurations intended to improve on its performance. From the early units that were used for data conversion from analog to digital as U.S. Pat. No. 2,995,736, referenced here in its entirety demonstrates, the technology has progressively been adapted to be used for many other applications involving linear positioning. For over half that time, magnetostrictive probes were adapted to be used for fuel level determination.

Due to constraints in tank entry ports, and the volatile nature of gasoline, restraints were maintained in introducing electrical equipment inside fuel tanks. With time, more knowledge was acquired. During that same time, electrical components were shrinking in size as well as power requirements. With this, it became possible to use miniaturized electrical elements in a probe.

The proposed adaptation of a magnetostrictive probe takes advantage of all of this miniaturization to benefit in shrinking the components to a degree where some circuitry could be relocated inside a small tube, thus making it possible to relocate the signal pickup to the foot of the probe. This is achieved without compromising the size of the tube in order to accommodate sufficient space for a floatation device.

Hunter et al. U.S. Pat. No. 5,076,100 here referenced in its entirety explains the operation of a magnetostrictive probe where, due to an interaction between two magnetic fields, a twist is produced in a waveguide medium and propagates in both directions. Pickup elements are placed strategically at one end of the waveguide, in this case at the canister's end, and the arrival of the twist gets detected, amplified and measured. By convention many manufacturers positioned the dampers mostly at the foot of the probe.

In this invention, the location of the pickup is reversed to be at the foot of the probe instead of the canister. This arrangement will grant many benefits as will be discussed in the details to follow.

The major departures from the convention found in this invention are mechanical in nature. All electrical standards of the operation of the probe remain the same. In the case of an intelligent probe, a central processing unit detailing the many functions of the probe is in place. Parameters such as fuel, water, and temperature are measured as in the standard fashion. In this probe a further element is introduced. Strategically, a data validation magnet 115 is put in place where the detector used to be located inside the canister. This magnet 115 needs to be read at predetermined intervals to allow this measurement to evaluate the integrity of any other height measurement performed by the probe.

Current generator, signal amplifier, signal detector, Inhibit generator, gate generator, counter, and data transmission circuits all remain the same as in basic circuits of any magnetostrictive probe. If temperature is involved, further circuitry is added to perform this function. All of this is controlled by the ASIC or microprocessor that was programmed to perform each function at a predetermined sequence.

Once the twist is produced and the waves travel through the wire, there results two components associated with every wave produced. Both longitudinal and a torsional components are running in the wire, of which the desirable one is the torsional wave, that runs ⅓ slower than the longitudinal wave. This characteristic makes it more appealing since it will also exhibit ⅓ more resolution with any given reading than its counterpart.

Figure 10:
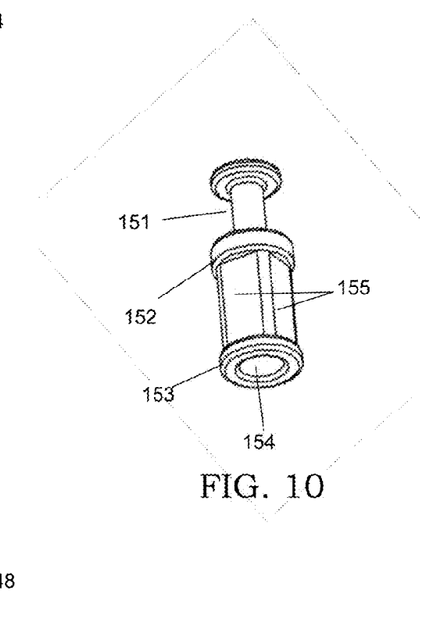

With all of these waves running up and down the wire, if not suppressed, they would cause the system to be very noisy and render a stable measurement almost impossible. To resolve this problem, damping elements are put in place to attenuate the redundant waves in the wire. The more efficient a damping system is, the quieter the base line for the measurement will be, and better readings will result from the sensor. Conventional probes place the damping element at the foot of the probe therefore creating a dead zone where no measurement could be performed. In this new arrangement, the principal damping elements 113 and 114 will be located inside the canister away from the active zone of the measurement. A cavity is also available under the pickup coil 150 where a small sleeve damper could be inserted to further attenuate redundant waves from reflecting back into the pickup coil and alter the natural symmetry of the obtained signal.

Figure 11:
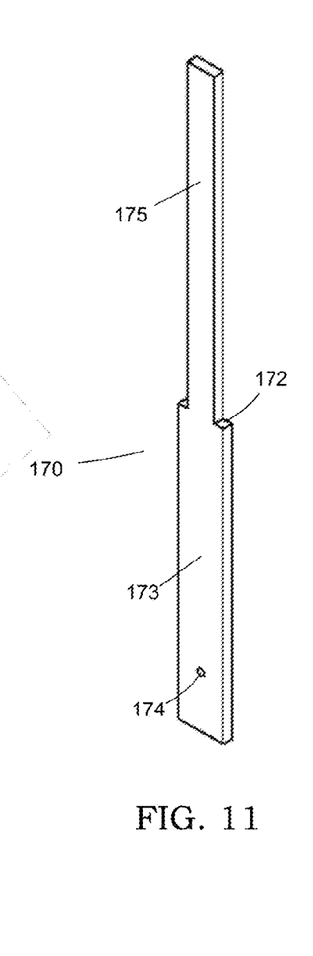
Figure 12A:
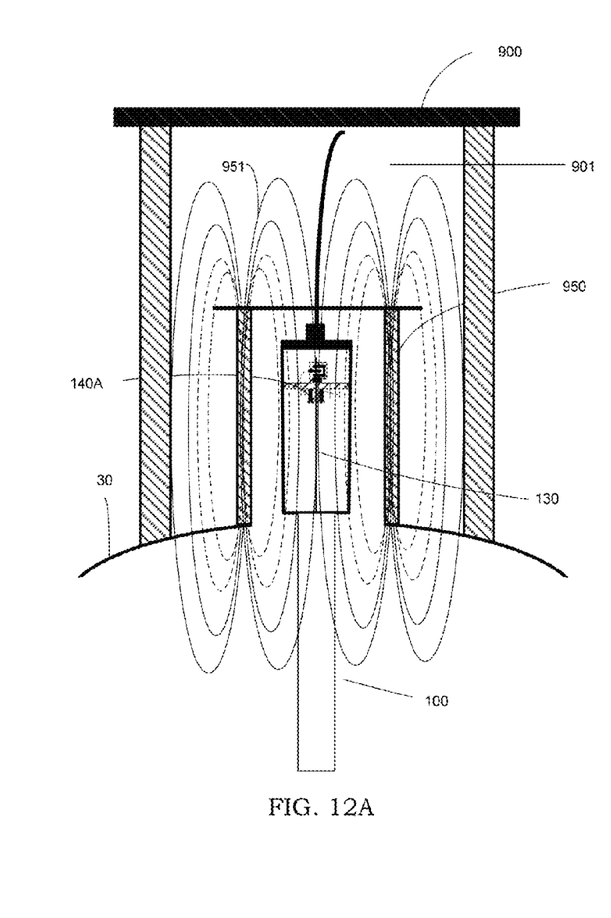
Figure 12B:
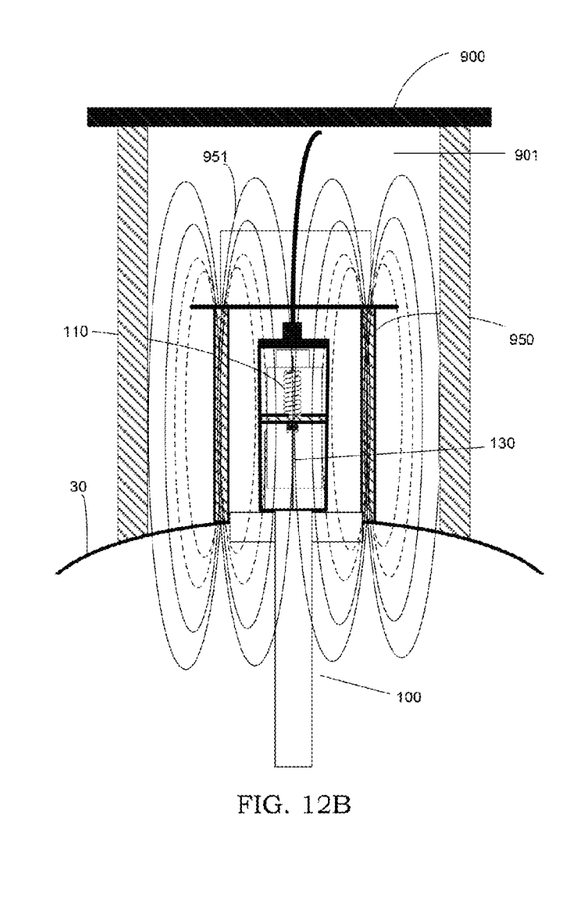

This bottom detection necessitates that the amplification takes place near the ultrasonic pickup elements to avoid introducing noises in the micro level signals that are produced at the detector. If those signals were to be channeled to the other end of the probe to be amplified, the signal to noise ratio would be so deteriorated that there would be no discernible signal left to be measured. This problem is resolved with the repositioning of the amplifier in board 170 near the pickup coil 150.

In lieu of having a reference magnet at the end of the probe, make use of a reflector or simply use dampers to attenuate the residual noises in the wire; this new approach occupies this region with the pickup coil. The advantages resulting from this strategic relocation are beneficial principally when a probe is used as a tank monitoring device. It is also of benefit if a measurement relative to the bottom of the probe is needed.

Conventional top detection systems are affected by many factors such as temperature, vibration, magnetic risers. Due to its near proximity to ground surface, any stray electromagnetic influences could be detected by the ultrasonic pickup and ruin what would have otherwise been a good reading.

For leak detection to be reliable when performed with the information obtained from the level gauge, it needs to be derived from an accurate height measurement. However, with the ultrasonic pickup located in the opposite end of the probe in relation to the level in the tank as is done in prior art, ascertaining an accurate level involves extra processes that are rendered unnecessary with this relocation of the pickup. The stability of the measurement, from the standpoint of temperature and interference to the detection apparatus, makes for a more precise tank leak detection capability as offered by this inverse signal detection method.

A magnetostrictive probe used in an underground tank is often located in an area where vehicles are allowed to drive over the manhole. In this case, ground vibrations are transferred to the probe and results in stray longitudinal waves that are intercepted by the detector. Although those signals may not be high enough to form discernible signals that could trigger the comparator output, they certainly constitute baseline noises that perturb the integrity of other readings. This new arrangement offers some attenuation to such waves due to the damping effect provided by the fuel in the tank. Since the detection end is always located inside the fluid, when such vibration occurs, it gets dissipated in the liquid and the residual that may reach the detector is rather insignificant. The benefits are even greater when the tank is full.

Figure 1:
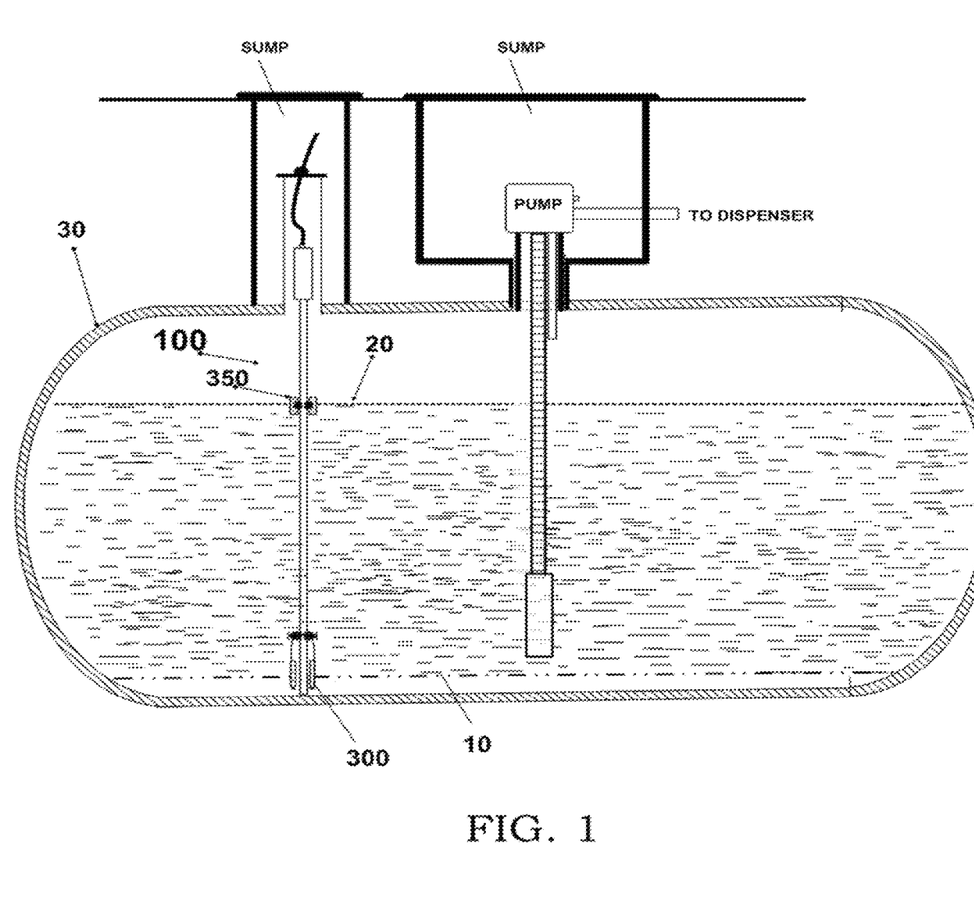
In FIG. 1, probe 100 is shown in the storage tank with the various components necessary for determining the fuel and water levels. From that location, the probe would be connected to the monitoring device where the data from the probe would be received for further tank status determination.

Refer to FIG. 1 where a system level of magnetostrictive probe 100 is illustrated showing it located inside a tank through riser pipe 950. This riser pipe in turn is enveloped by an outer jacket 900 forming a sump cavity 901. That location, when considered in light of a fueling environment construction, is located below the pavement and protected by a large steel cover. This arrangement may be sturdy enough to allow a vehicle of a few tons to run over the cavity without collapsing it, but is by nature a very poor location for placing the detection circuit of a sensitive sensor such as a magnetostrictive probe. With critical determinations to be performed as a tank level detector and leak detector, the precision to be obtained from a probe needs to be better than 0.0005". With temperature and vibrations affecting the system, even in cases where the electronics can read with a very high resolution, the measurement obtained is degraded by reason of the detector's location.

Ultrasonic pickups such as coil 150 found in this invention are very stable over the temperature range that this probe could encounter in this kind of environment. However, the magnetostrictive wire 130 by contrast is a sensitive element when it comes to its operation over temperature. Its grain structures are largely influenced by temperature and the permeability of the system is affected to the point where the detected signal suffers negatively in the presence of rising temperature. On account of the pickup locations, detections in probes are affected by a wide range in temperature in the course of a given day that could span over 30° C. in a 24 hour period. When changes in season take place in northern and southern hemispheres, the effect in the course of a year is even more drastic.

Anyone familiar to the operation of a magnetostrictive probe can attest that variances in temperature of such order affects more than the expansion and contraction of the mechanical parts forming the probe, but can shift the accuracy of the system simply by changing the slew rate of the signals, therefore, causing errors in the heights measured as well. By repositioning the detector, whether it is a pickup coil or a piezoelectric crystal, to a location that is not subjected to such a wide variance in temperature, the performance of the system will be made drastically more stable. This invention accomplishes this in relocating the ultrasonic pickup to the foot of the probe. By taking advantage of the geothermal stability of underground tanks, or simply the thermal mass of the fuel even in cases where the tank is used aboveground, a more stable reading can be obtained due to the fact that the detection will benefit from the wire not being affected by sudden changes in temperature.

Another effect of temperature that degrades the performance of a magnetostrictive probe is the expansion and contraction of the whole frame of the probe. Many schemes have been derived to help reduce such an impact in probe performance but each and every one comes at a price. Whether with tension applied to the wire or not, a measurement is affected when the structure of its frame is changing with temperature. The aim is always to maintain constant tension in the wire which could add some complexity to the mechanical design. When tension is changing in a wire used for a linear positioning device, the torque in the wire causes the signal's velocity of propagation to be affected, and the measurement suffers as a result. With no tension, the wire is left to ride with the tube causing the point of references to change, thus causing instability and errors in the measurement as well. With this inversion, the added benefit of the data validation magnet is introduced to allow studying the changes in the wire, and algorithms could be devised to correct the errors.

Figure 7:
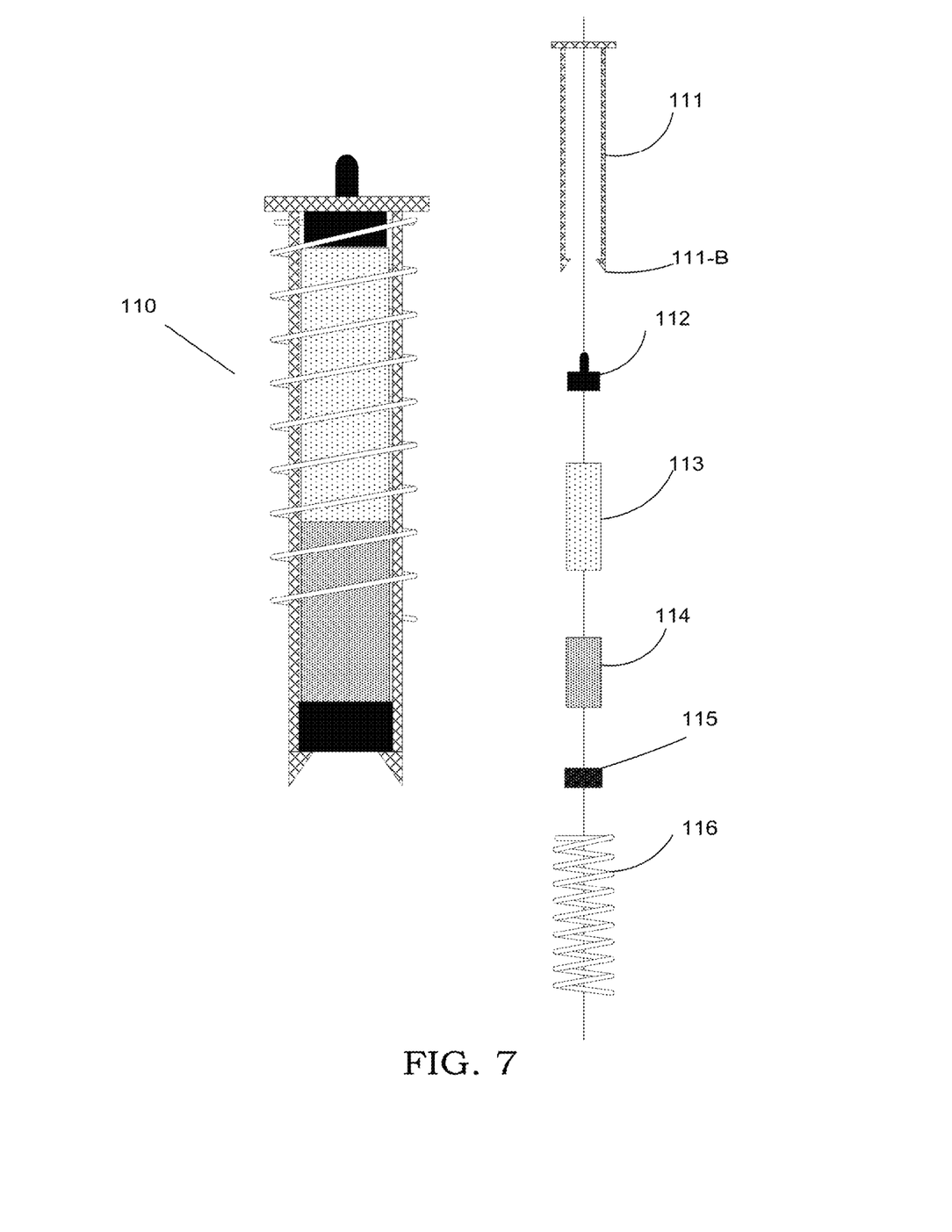

The data validation magnet is primarily intended to take advantage of its fixed location on the wire to help determine the integrity of a height measurement, particularly if the system is used in a noisy environment. Whether the source of the noise is electrical or mechanical, this test allows the system to verify the integrity of other height readings and either accepts or simply rejects them if found to be unacceptable. This measurement is taken at the time of calibration of the probe and is stored into memory to serve as a reference to test the integrity of other readings. This reading is from a known height, and the fuel or water heights gathered must never be greater than that validation reference reading. Where a parity check on a transmitted data fails to detect errors in the transmission, this piece of information is used to accept or reject that data. The criterion for discarding the data is based on the fact that no reading should be greater than that particular reference height. By reason of the location of magnet 115 at the farthest possible location at the other extremity of wire 130, no other distance measurement should be greater than that validation reference gate.

The data validation magnet 115 by reason of its location inside riser pipe 950 is also used to help overcome any stray magnetic signals imposed on the wire by the giant bar magnet this pipe sometimes becomes. Since the presence of the data validation magnet is in near proximity to the waveguide, the resulting signal coming from it will be greater than the one coming from the pipe, therefore nulling its effect in the system.

The repositioning of the pickup assembly to the bottom of the probe also places it away from the giant magnetic field resulting from riser pipe 950. This field causes a distortion in the domain magnetization and results in distorted signals when the ultrasonic pickup is located inside the canister. The consequences of this magnetic field on the ultrasonic pickup could be so disastrous that the operation of the probe could be completely compromised.

Figure 3:
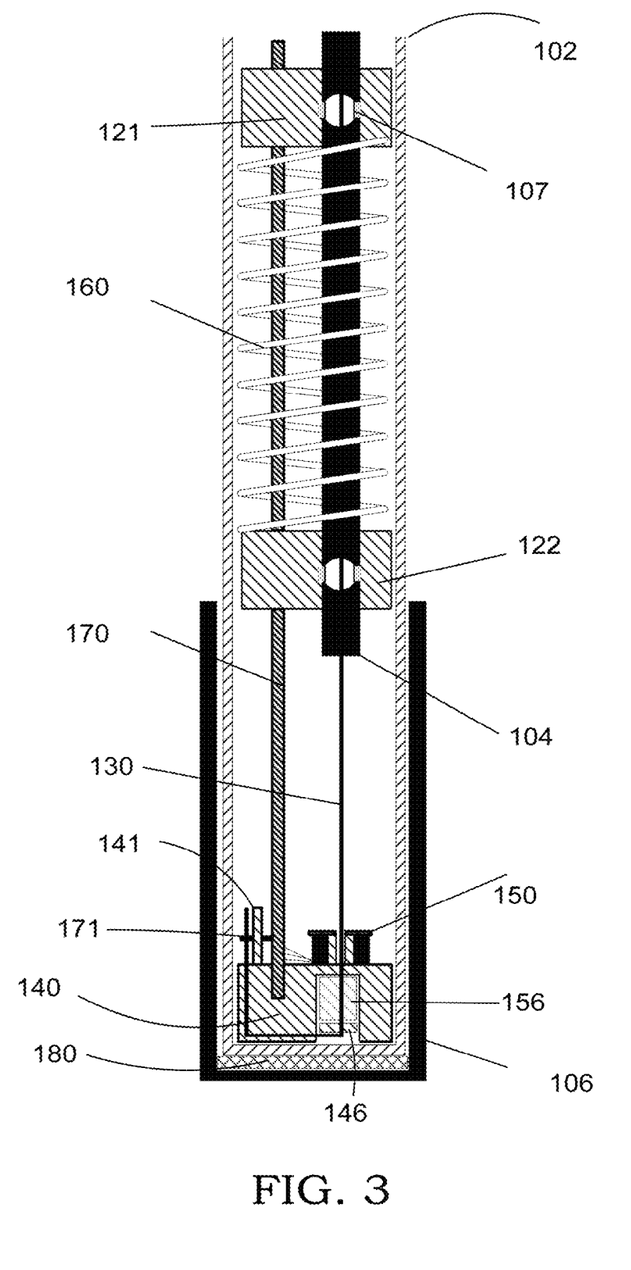
Figure 4:
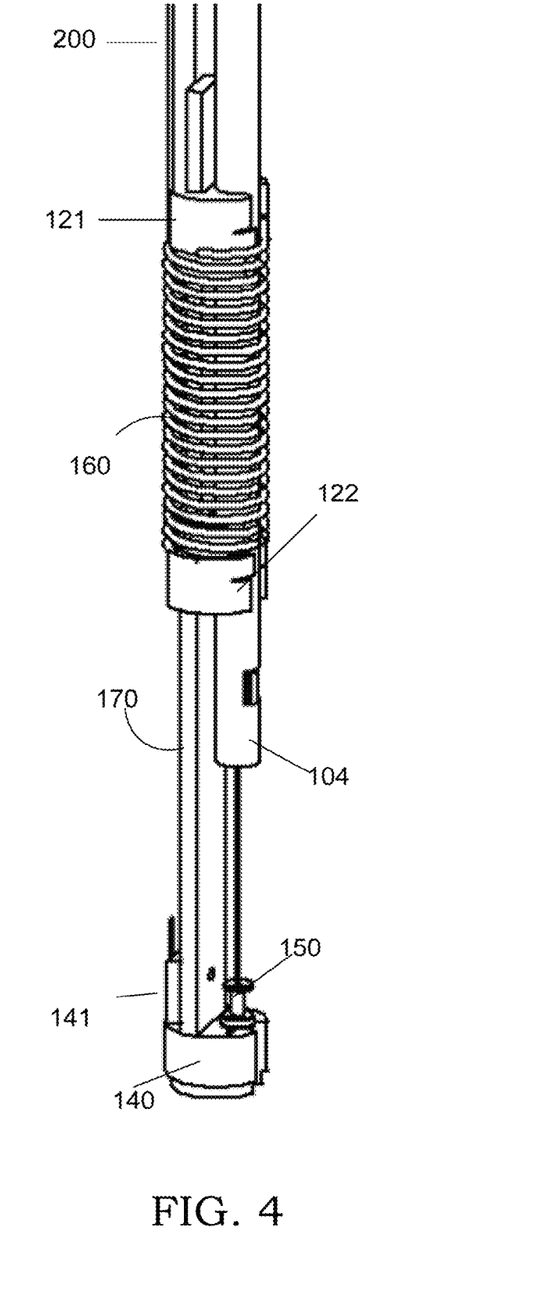
FIG. 4 is a parametric view of the assembly of the internal foot of the probe where the pickup coils 150 can be seen inserted into the bottom pickup assembly 140. In this view the circuit board 170 is shown forming the bridge connecting the upper portion of the probe to the pickup assembly with the aid of the bottom compression assembly.
Figure 5:
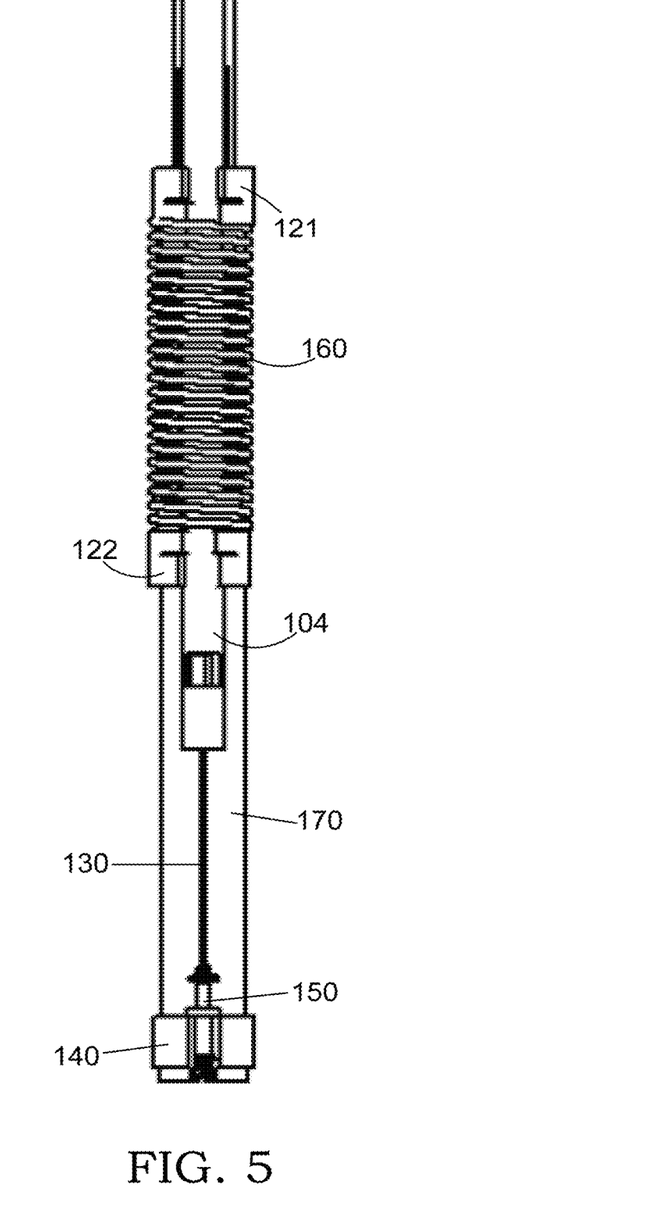
FIG. 5 is an alternate view of the bottom footer showing the protrusion of internal tube 104 forming a structural frame for the bottom compression assembly. In this arrangement, the wire 130 is seen going through the pickup 150 and internal tube 104.

In order to fully take advantage of this configuration, the bottom of the probe is set to remain at the bottom of the tank eliminating any variations associated with either the tank or the probe due to temperature changes and other geological shifts imposed on the tank. Great consideration was taken into keeping the bottom pickup assembly always at the very bottom of the probe. This is achieved by means of the bottom compression assembly made up of spring 160, and the spacers 121 and 122 acting as carriers for spring 160. That assembly exerts a downward force against the bottom pickup assembly 140 by way of the amplifier board 170.

Spring 160 is set to have a rate of approximately 6 pounds and is calibrated to be at the middle of its range and allowed to compress or expand in relation to change in temperature that gets transmitted through inner tube 104. That inner tube 104 is secured to spacer 121 and allowed to run freely through spacer 122. When changes in length of inner tube 104 occurs, the spring varies and tries to change in relation to the motion to maintain a downward pressure against board 170, which then is transmitted to the bottom pickup assembly 140.

Tube 104 bridging the two spacers 121 and 122, as illustrated in FIG. 3, along with the amplifier board's section 175 represented in FIG. 11, form a framing for the bottom compression assembly preventing it from twisting and permitting it to maintain its rigidity.

Inner tube 104 is to be made of aluminum or stainless steel but could be a rigid plastic tube that cannot be easily bent under the pressure of the 6 pound spring 160. It is to be secured to frame 105 and to spacer 121 so that all expansion and contraction of the system gets transmitted to tube 104. As such, the motion would be intercepted by spring 160 which in turn would work at maintaining the bottom pickup assembly 140 in its fixed place.

Figure 2:
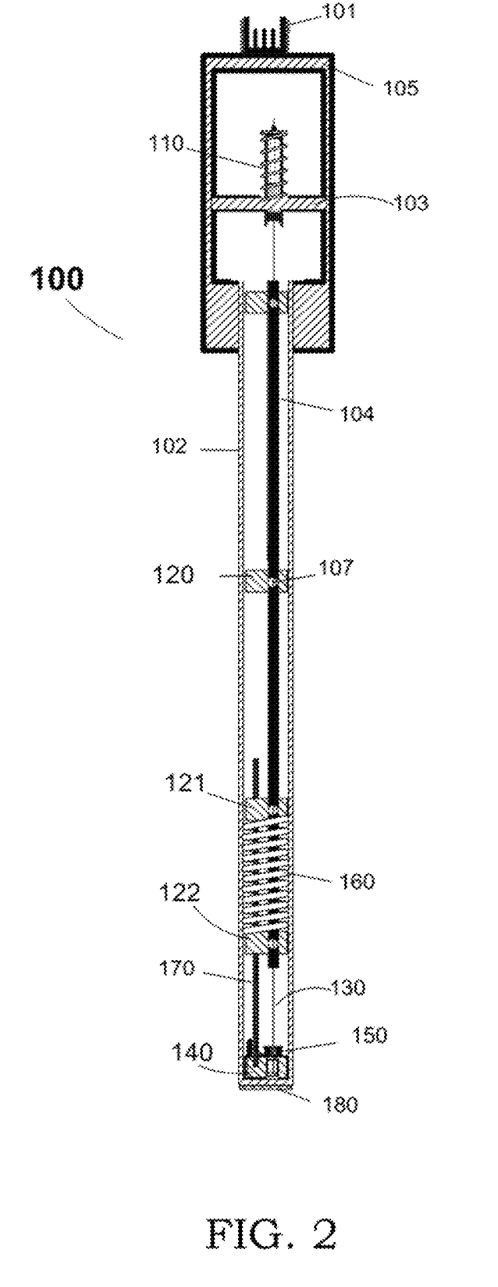

The goal of maintaining waveguide 130 under tension would negatively impact the consistency of signal propagation in the wire, due to changes in temperature, without the proper operation of the tensioning assembly 110 seen in FIG. 2. There, the spring gets adjusted to accommodate changes in tube length which are far greater than those of the magnetostrictive wire 130.

Figure 13:
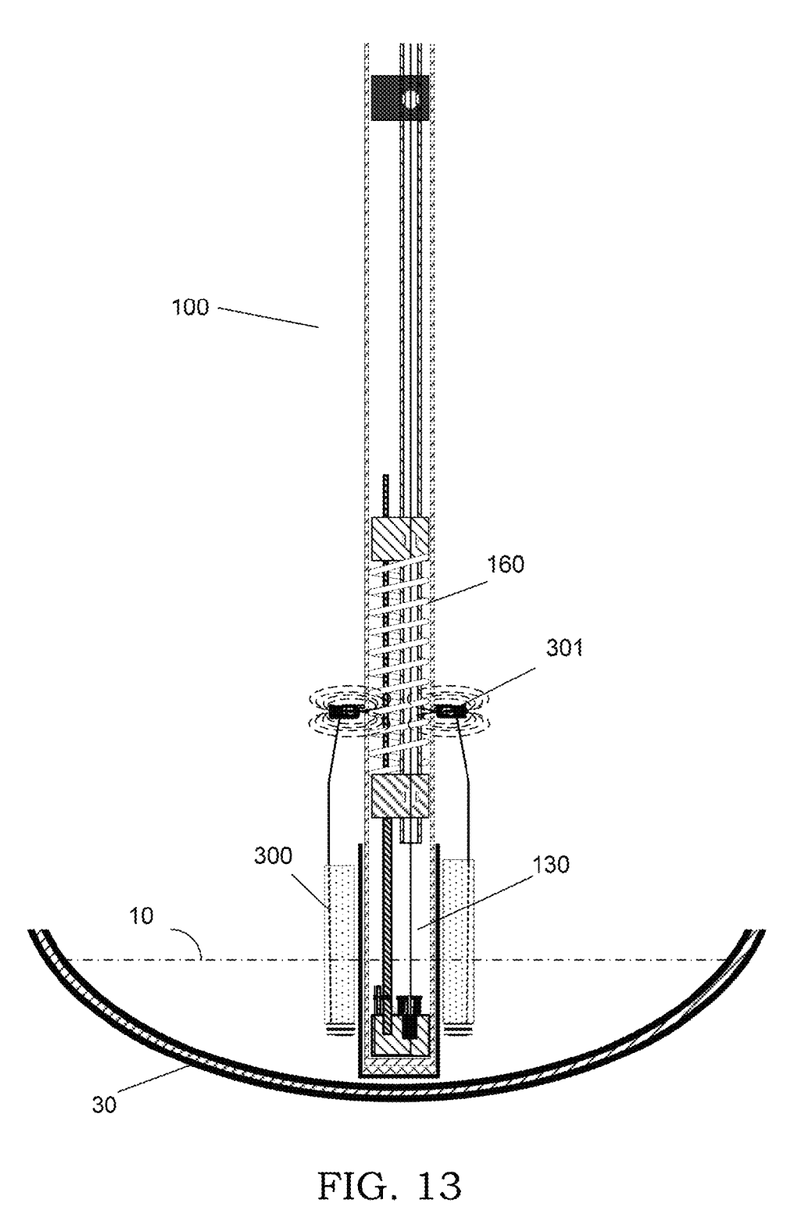
FIG. 13 is a representation of this current adaptation where it is inserted inside a water float. This is intended to show that the magnetic fields emanating from the permanent magnet in the float is in the region where spring 160 would be located. As such, spring 160 needs to be made of a nonmagnetic material such as copper or brass.
Figure 14:
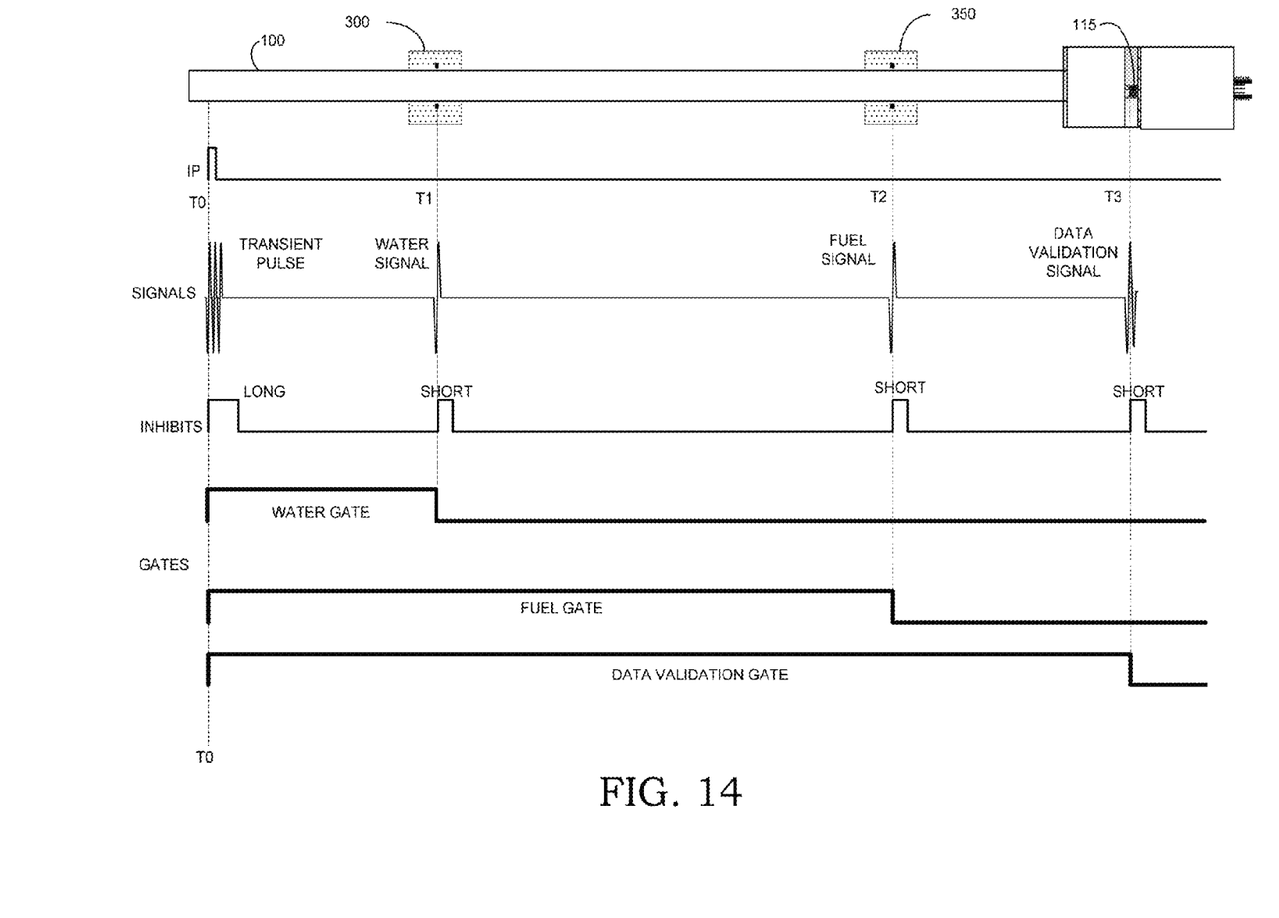
In FIG. 14 a timing chart is produced to illustrate the formation of the pulse width modulations in relation to the signals obtained from this probe.

FIG. 2 also shows the internal assembly of probe 100. That view illustrates the repositioning of the assembly where the waveguide wire runs closely along the edge. This will place it closer to tube 102, putting the wire closer to the magnets located inside the floats as illustrated in FIG. 13. With this arrangement in FIG. 13, the wire will be affected by stronger fields from magnet 301 resulting in stronger signals. This arrangement serves not only at shifting the wire away from the center of the probe where more room is created to position the amplifier board 170, but it also serves the other means of achieving higher signal levels.

Figure 9A:
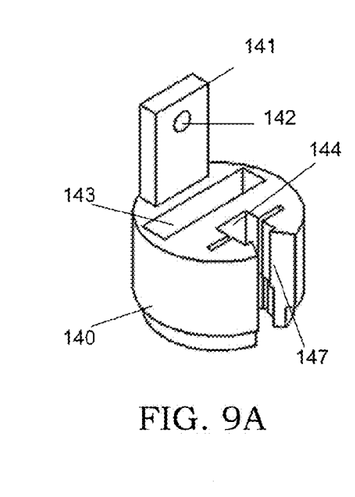
Figure 9B:
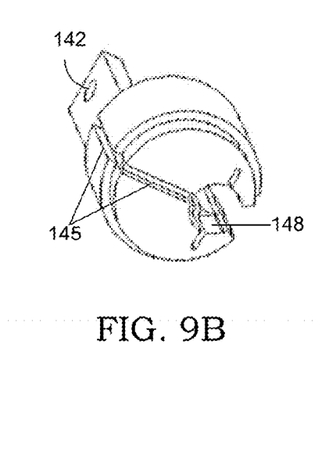

The termination of the wire at the bottom of the probe could be made by many approaches. In this arrangement, it is represented as two 90° angle bends that are channeled through bottom pickup assembly 140 by way of channels 145 seen in FIG. 9B. The loop takes the wire back to a location where it can be mechanically secured to the assembly while making electrical contact with terminal 171 as illustrated in FIG. 3.

Coming from the pickup coil 150 before being bent into the first 90° angle, the wire needs to be supported in order to remain as a straight piece as it is going through the pickup coil. To correct the assembly from having any deviation in this arrangement, a centering piece 146 is shown in FIG. 3 that perform this very role.

In order to keep the outer shell of the probe at ground potential, the protective measure against a cathodic reaction is customarily to protect the lower region of a probe with a plastic isolation boot. For that purpose, this design calls for boot 106 to be placed at the end of the probe.

The likeliness exists that some steel tanks may have some low residual magnetization all throughout the tank structure. In view of this, the provision is made for a small piece of mu shield metal 180 to be incorporated inside the boot where it could serve as a barrier preventing the small magnetic field from affecting wire 130 and causing any disturbance to the signal detection.

Figure 8:
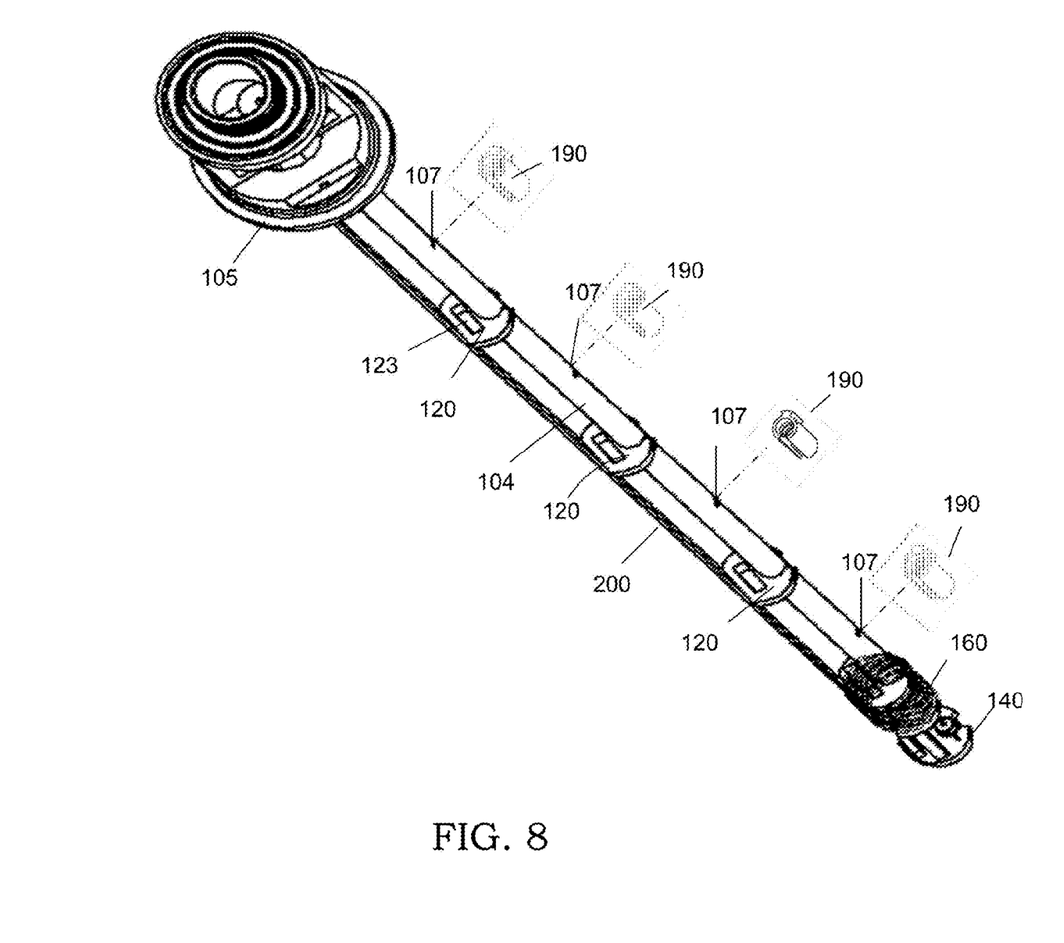
FIG. 8 is showing the probe's structure made primarily with inner tube 104 supported by the spacing elements 120 that are locked into place at 12" intervals. The spacing elements 120 could be secured to inner tube 104 by one of two means. Either they are simply snapped into place using the provided snaps from the spacer that will locate them into holes 107, or they can be secured into any location along the tube by means of an internal set screw not shown. Cavity 123 of spacer 120 can be used to harness the wires connecting the amplifier board 170, not shown, to upper control boards.

Due to the location of the amplifier board 170 at the very foot of the probe, and the remainder of the circuitry located inside the canister on top of the probe, supply voltages and control signals need to be provided to the board. To accommodate for this, FIG. 8 shows spacers 120 located at 12" intervals along the skeleton of the probe with cavity 123 that is intended to harness the wires connecting the boards. The wires are not represented in the picture.

Temperature sensors situated inside tube 102 are also connected to a harness running along the outside of spacers 120. This harness connects the sensors to the measuring circuitry while keeping them near the pipe where they can sense the temperature of the nearby fuel.

Spacers 120 in this arrangement are configured to perform many duties. They are arranged as the skeleton of the probe located at 12" intervals. They also are used as the carriers 121 and 122 supporting the spring 160 where together they form the bottom compression assembly.

For easy assembly of the waveguide wire inside the inner tube 104, provision is made where the wire can be pushed through the inner tube and later be isolated from touching the side of the said tube by means of isolators 190. Insertion of those isolators is facilitated by means of holes 107 situated along the inner tube at 6" intervals.

Holes 107 are also used to lock spacers 120 in place without the need of setscrews. Provision is made from the spacers to have snaps that mate into those holes.

The bottom compression assembly is strategically located near the end of the probe where the downward force exerted by the spring would work at keeping the bottom pickup assembly 140 always situated at the tip of the probe. For this to be done, however, a spring is needed that happens to be right in the path of the water float's magnet 301. For that reason, the spring could easily become magnetized and act as a fixed positioned magnet. To prevent this from happening, the spring to be used is to be constructed of a nonmagnetic material such as copper, beryllium, or brass, etc.

The bottom compression assembly uses the amplifier board 170 to push against the pickup assembly 140. For that reason, board 170 needs to be sturdy enough to not bow under the pressure exerted by spring 160.

The outer tube 102 when joined to frame 105 needs to be secured in place to prevent it from dislodging from the frame and causing the tensioning of the probe to become undone. By way of hole 105-B shown in FIG. 6, the tube can be secured to the frame with the use of a setscrew.

Figure 6:
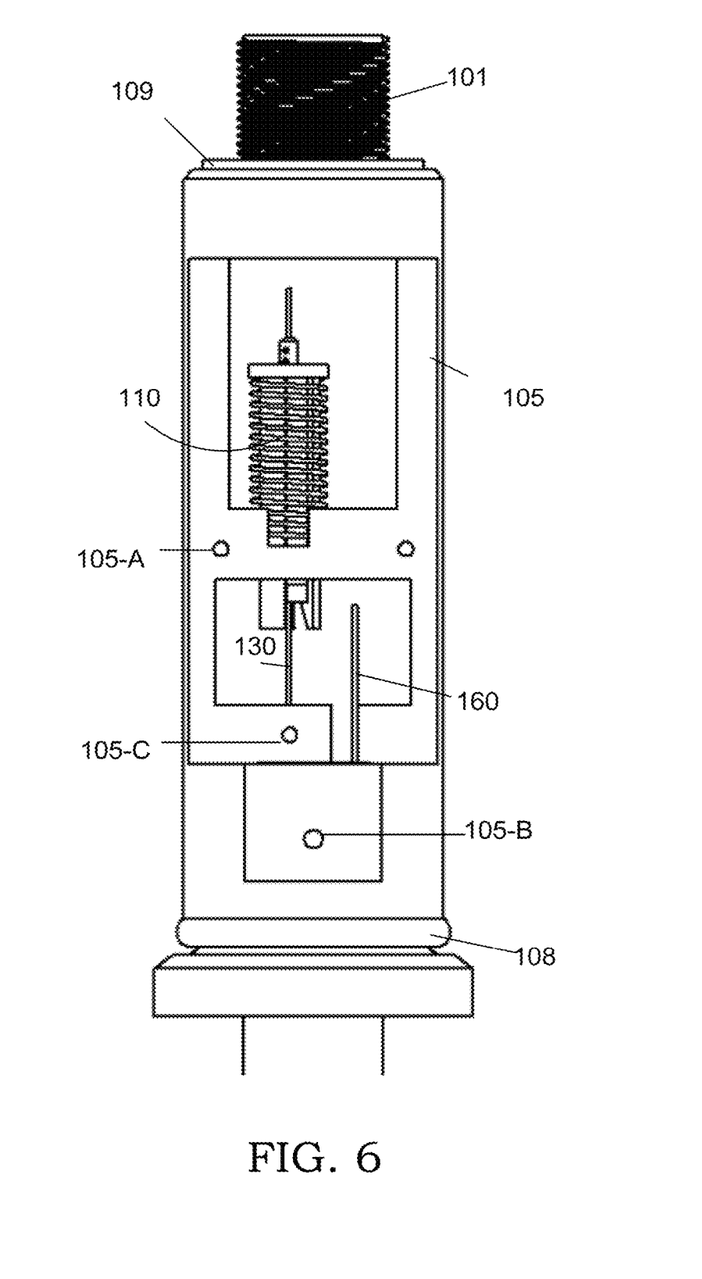

The inner tube 104 is also secured to the frame by way of hole 105-C seen in FIG. 6 and to spacer 121 by means of a setscrew. This will allow the tube to move with expansion and contraction of the structure of the probe while keeping pressure to the bottom pickup assembly at all times.

Most of the circuitry needed to control the probe would be located inside the frame. Locations on both sides of the frame are available where circuit boards could be mounted and secured to the frame by way of holes 105-A seen in FIG. 6. From those boards, connection to the outside monitoring console could be established through connector 101, also seen in FIG. 6. The temperature harness as well as interconnects between the boards could also be attached to the satellite boards not represented.

This construction detailed in this invention constitutes one embodiment of the construction of the "Magnetostrictive Probe With Inverted Signal Detection" concept. It remains that anyone skilled in the art will realize that other aspects of this invention not mentioned constitute other embodiments related to the spirit of the technique utilized and remain within the scope of this invention.

The invention claimed is:

1. A magnetostrictive probe adapted to monitor liquid level comprising:
   an ultrasonic pulse signal detection assembly apparatus situated at the foot of the probe,
   a wire tensioning assembly system located in line with the waveguide inside the canister located at the top of the probe,
   a bottom compression assembly located inside a sealed tube,
   the sealed tube containing a ferromagnetic wire which is placed vertically in the tank so as to approximately reach the bottom of said container, and extend above the fill level of said container,
   a float for each type of liquid to be measured, whether one liquid or two or more liquids which are separated due to density differences,
   a magnet in each of said float(s), which interacts with magnetic fields, generated in said magnetostrictive wire by current pulses to generate ultrasonic waves that travel in both directions along said wire,
   a circuit which converts said wire signal to digital pulses for transmission to a central control located away from said probe assembly and which serves to analyze said data for operator presentation in usable formats,
   a series of temperature sensors at points along said probe for said circuit data conversion for transmission to said external control.

2. The ultrasonic pulse signal detection assembly apparatus of claim 1, wherein a bottom ultrasonic pulse pickup block assembly is located internally at the end of the tube for the purpose of assembling the ultrasonic pickup coils or piezoelectric crystal membrane, with the circuit.

3. The ultrasonic pulse signal detection assembly apparatus of claim 2, wherein a bottom pickup is placed at the foot of the probe to take advantage of the thermal mass of the fuel and, in the case of underground systems, the geothermal stability for improved measurement.

4. The ultrasonic pulse signal detection assembly apparatus of claim 2, wherein said pickup block is made of a piezoelectric crystal or a coil based system directly coupled to the wire or further employs mode converter tapes in the detection process.

5. The ultrasonic pulse signal detection assembly apparatus of claim 1, wherein a circuit board is located next to the ultrasonic pickup apparatus to allow near proximity amplification of the probe signals.

6. The ultrasonic pulse signal detection assembly apparatus of claim 1, wherein a means of connecting the ferromagnetic wire to the circuit is provided.

7. A circuit of claim 1 which uses either an ASIC (application specific IC) or a microprocessor for timing, measurements, logic functions, data analysis and data storage.

8. The tensioning assembly system of claim 1, wherein a bridge is located in mid-section of the top frame allowing sufficient spacing for wire movement due to expansion and contraction.

9. The tensioning assembly system of claim 1, wherein a framed skeleton having an internal cavity terminated with engagement lips is used to position and secure the elements of said assembly together in a fixed location along the ferromagnetic wire as the probe expands and contracts.

10. The tensioning assembly system of claim 9, wherein a waveguide electrical piece made of a conductive material, such as brass or copper, is used to provide electrical connection to the ferromagnetic wire.

11. The tensioning assembly system of claim 10, wherein the said waveguide electrical piece is also used to secure the wire using a setscrew after tension adjustment.

12. The tensioning assembly system of claim 9, wherein said internal cavity is offered to allow insertion of damping elements over the waveguide wire.

13. The tensioning assembly system of claim 9, wherein the said internal cavity is also used to locate a multipurpose data validation magnet, or an electromagnet, embedded within the assembly and positioned in near proximity to the waveguide wire.

14. The tensioning assembly system of claim 9, wherein a linear compression spring is used for the purpose of providing top tension for the ferromagnetic wire.

15. The bottom compression assembly system of claim 1, wherein spring carriers provide alignment for an amplifier board and the internal waveguide carrying tube.

16. The bottom compression assembly system of claim 15, wherein said amplifier board is used to apply a downward pressure against the detection assembly keeping said assembly always at the bottom of the tube.

17. The bottom compression assembly system of claim 15, wherein the top spring carrier is secured to the internal tube and exerts an upward push against it for temperature adjustment.

18. The bottom compression assembly system of claim 15, wherein the spring used is made of a non-magnetic material, such as copper, brass or the like.

19. A magnetostrictive probe adapted for distance measurement which includes:

a method for enhancing signal level,
a method for nulling out the effect of magnetically charged risers,
a method for referencing height measurements,
a method for validating height measurement,
wherein a magnetostrictive wire is shifted away from the center of an outer tube by using spacers, thereby bringing it closer to position magnets,
wherein an ultrasonic pickup assembly is located at the foot of a probe away from magnetic fields emitted by said risers,
nulling out the effect of the magnetically charged risers, wherein an axially charged magnet is located in proximity to the magnetostrictive wire inside a canister to overcome the effect of stray magnetic fields,
wherein a twist being measured representing various heights is referenced to the ultrasonic signal pickup located a foot of the probe,
wherein a magnet located near the tip of the wire inside a canister, by reason of its location near the tip of a probe, provides a signal which when measured represents a distance greater than any other heights taken along the active section of the probe, said height is used to validate or to reject heights that exceed said validation height when affected by noises in the system,
wherein a crystal is used to induce a vibration in the wire for said purpose.

* * * * *